(No Model.)

J. M. BOYER.
SUPPORTING LEVER BRACKET.

No. 557,955. Patented Apr. 7, 1896.

Witnesses:
J. H. Hinman
Peter A. Ross

Inventor:
Jean M. Boyer,
by Henry Connett
his Attorney

UNITED STATES PATENT OFFICE.

JEAN MARIE BOYER, OF PARIS, FRANCE.

SUPPORTING LEVER-BRACKET.

SPECIFICATION forming part of Letters Patent No. 557,955, dated April 7, 1896.

Application filed December 20, 1895. Serial No. 572,800. (No model.) Patented in France September 13, 1894, No. 241,381; in Belgium March 28, 1895, No. 114,780; in England March 29, 1895, No. 6,506, and in Germany April 9, 1895, No. 83,935.

*To all whom it may concern:*

Be it known that I, JEAN MARIE BOYER, a citizen of the French Republic, residing in Paris, France, have invented certain new and useful Improvements in Supporting Lever-Brackets, (for which patents have been granted in France, No. 241,381, dated September 13, 1894; in Belgium, No. 114,780, dated March 28, 1895; in Great Britain, No. 6,506, dated March 29, 1895, and in Germany, No. 83,935, dated April 9, 1895,) of which the following is a specification.

My invention relates to adjustable brackets or supports; and the object is to provide a simple and convenient bracket adapted to be shifted and fixed at any desired level on an upright or standard, the bracket being designed to support or to assist in the support of a shelf or the like.

The accompanying drawings illustrate an embodiment of my invention.

Figure 1:
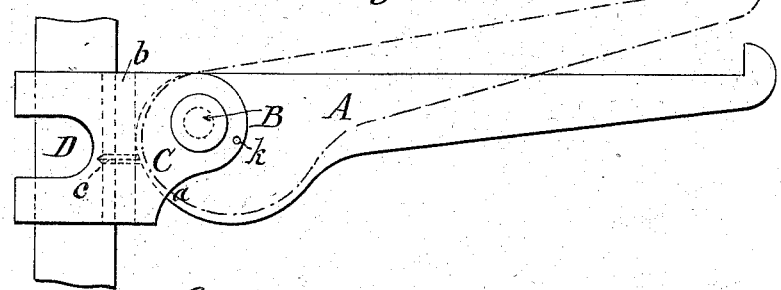
Figure 2:
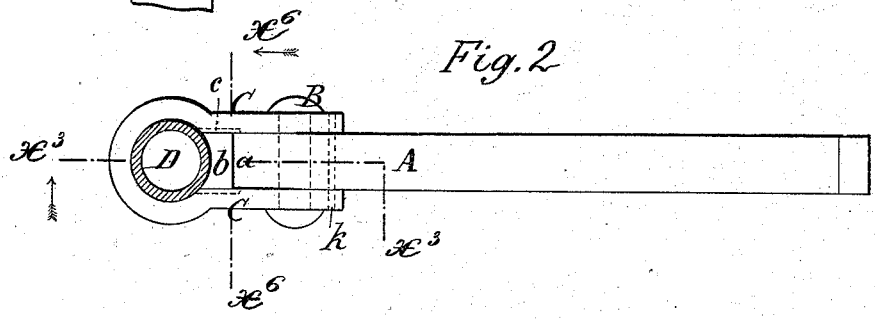
Figure 3:
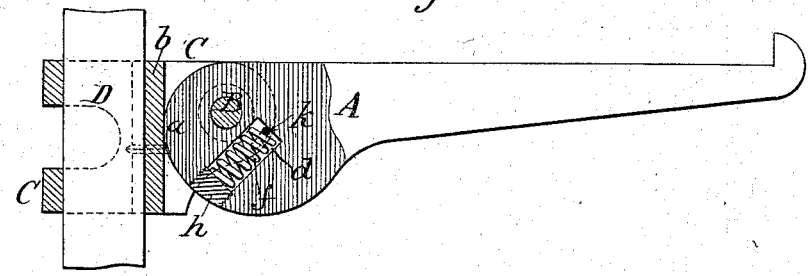
Figure 4:
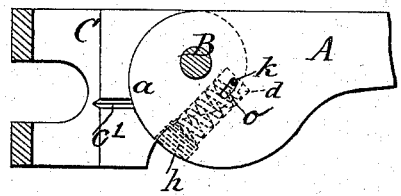
Figure 5:
Figure 6:
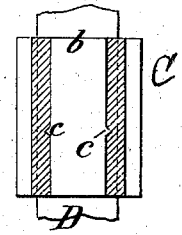

Figure 1 is a side elevation of the bracket and the upright on which it is mounted. Fig. 2 is a plan view of the same. Fig. 3 is a section on line $x^3$ in Fig. 2. Fig. 4 is a sectional view from which the upright D is omitted, the clamping yoke and block being in section. Fig. 5 is a side view of the clamping-block $b$ detached. Fig. 6 is a transverse section of the yoke C in the plane indicated by the line $x^6$ in Fig. 2.

D represents a standard or upright, here shown as tubular and cylindrical, although this is not essential. C is a yoke embracing said upright. Between the cheek-pieces of said yoke is mounted a lever-bracket A, fulcrumed on a bolt or pin B. The head or end of this bracket is in the form of an eccentric or cam, which, when the bracket is brought down to a horizontal position, (indicated by full lines in Figs. 1 and 3,) serves to press a clamping-block $b$ up against the upright D, and thus lock the bracket firmly in place on the said upright. The cam portion or eccentric portion $a$ of the bracket may be substantially a volute in form, as shown in the drawings. The block $b$ has guide-ribs $c$ on its sides, (see Fig. 5,) which engage correspondingly-shaped grooves $c'$ (see Fig. 4) in the inner faces of the cheeks of the yoke C.

When the bracket A is elevated to the position indicated in broken lines in Fig. 1, the cam $a$ ceases to press the block $b$ into forcible contact with the upright D, and the yoke C may be readily moved up or down along the upright, so as to set the bracket at the desired level or height. If the upright be cylindrical, as herein shown, the bracket may also be moved around horizontally thereon. It will be obvious that owing to the eccentric form of the cam $a$ the heavier the weight on the arm of the bracket A the stronger will be the clamping-pressure on the upright D.

To effect the automatic clamping of the yoke on the standard or upright when there is no weight on the bracket A, I employ the device I will now describe and which is best illustrated in Fig. 3.

In the cam $a$ is formed a recess $d$, in which is a coil-spring $f$. The recess is closed at its bottom by a plug $h$, the outer end of which is formed flush with the face of the cam $a$.

A pin or rod $k$, secured at its ends in the cheek-pieces of the yoke C, extends through the cam $a$ and the cavity or recess $d$, said pin $k$ occupying slots $o$ in the cam. The pin passes through the inner end of the spring-recess $d$ and over the inner end of the spring $f$ therein. The effect of this construction is that when the bracket is elevated above the horizontal position the spring $f$ is compressed and, reacting on the plug $h$, tends to depress the bracket again to the horizontal position when the latter is released, thus locking the bracket to the upright.

The guides $c$ on the block $b$ serve to keep the latter from slipping out of the yoke when the latter is removed from the upright or standard.

The device as represented is embodied in a form of standard and bracket suitable for supporting a glass shelf in a show-window for the display of goods; but the invention may as well be applied to other uses.

The arm of the lever-bracket may be replaced by any other shaped supporting device, as a hook, a straight metal or wooden bar, a clip, or indeed any form of supporter for merchandise or the like.

My invention does not reside in the special form of the arm of the bracket, nor is it limited to the use of the spring for automatically locking the yoke to the standard.

Having thus described my invention, I claim—

1. An adjustable supporting device adapted to be mounted on an upright or standard, comprising a yoke adapted to snugly embrace the standard, a lever-bracket fulcrumed in the cheek-pieces of the yoke and provided with a cam as described, and a block mounted in bearings in the cheek-pieces of the yoke and interposed between the opening in the yoke to be occupied by the standard and the said cam, the cam being adapted to bear on said block and clamp the bracket firmly when the latter is depressed to the proper position, as set forth.

2. The combination with the yoke C, having cheek-pieces and grooves $c'$, the block $b$, having guides $c$ engaging said grooves, and the lever-bracket A, fulcrumed in the cheek-pieces of the yoke and having a cam $a$ adapted to bear on the block $b$ when the bracket is depressed to the desired position, substantially as set forth.

3. The combination with the yoke C, the block $b$, mounted therein, and the lever-bracket A, mounted pivotally in the cheek-pieces of the yoke, of the spring $f$, mounted in a closed recess in the cam $a$ of the bracket, and a pin $k$, fixed at its ends in the cheek-pieces of the yoke and extending through slots $o$ in the cam and through the spring-recess, said pin bearing on the end of the spring therein, substantially as and for the purposes set forth.

In witness whereof I have hereunto signed my name in the presence of two subscribing witnesses.

JEAN MARIE BOYER.

Witnesses:
CLYDE SHROPSHIRE,
AUGUSTE MATHIERY.